(No Model.) 2 Sheets—Sheet 2.
J. R. NORCOTT.
PLANTER.
No. 529,298. Patented Nov. 13, 1894.
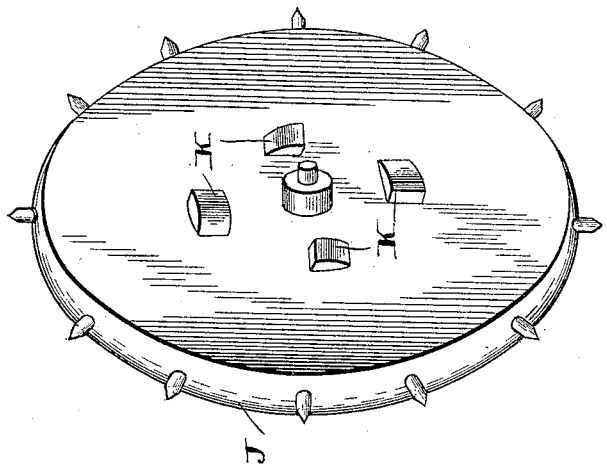
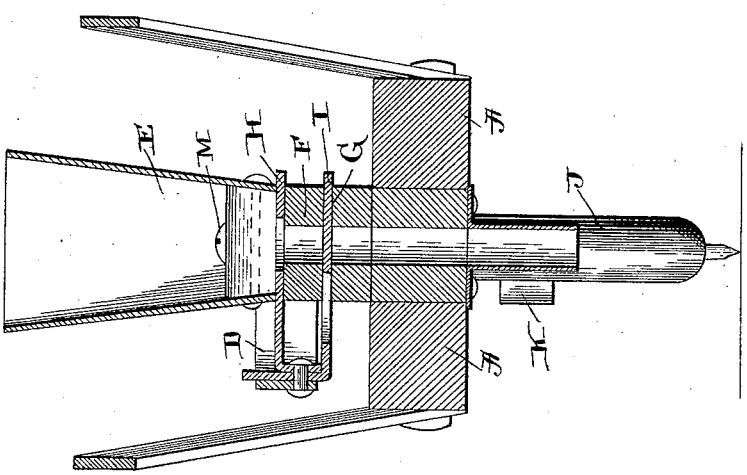
WITNESSES
Geo. E. Frech.
James W. Bevans.
INVENTOR
J. R. Norcott
By Lehmann Pattison & Nesbit
attys.
THE NORRIS PETERS CO., PHOTO-LITHO., WASHINGTON, D. C.

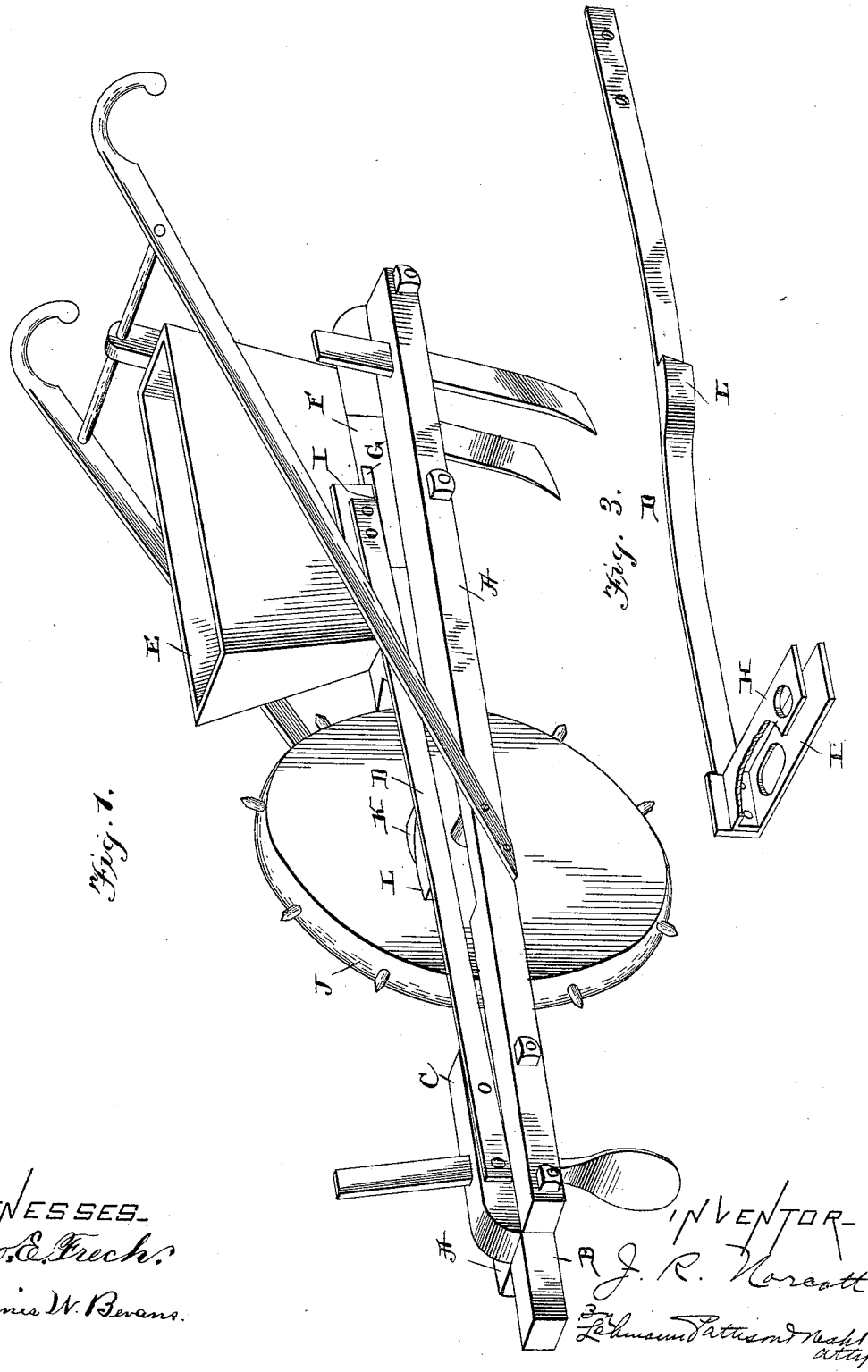

UNITED STATES PATENT OFFICE.

JAMES R. NORCOTT, OF BARLING, ARKANSAS.

PLANTER.

SPECIFICATION forming part of Letters Patent No. 529,298, dated November 13, 1894.

Application filed May 29, 1894. Serial No. 512,920. (No model.)

*To all whom it may concern:*

Be it known that I, JAMES R. NORCOTT, of Barling, in the county of Sebastian and State of Arkansas, have invented certain new and useful Improvements in Planters; and I do hereby declare the following to be a full, clear, and exact description of the invention, such as will enable others skilled in the art to which it pertains to make and use it, reference being had to the accompanying drawings, which form part of this specification.

My invention relates to an improvement in planters; and the object of the same is to construct an improved implement capable of planting all varieties of farm and garden seeds, thus avoiding the expense of a machine for each kind of seed planted.

The further object of my invention is to provide the seed discharge with an improved operating device, whereby the seed is dropped evenly and effectually.

The invention consists in the novel features of construction and in the combination and arrangement of parts hereinafter fully described and claimed, and illustrated in the accompanying drawings, in which—

Figure 1 is a perspective view of the planter. Fig. 2 is a vertical cross sectional view. Fig. 3 is a detached view of the slide operating spring. Fig. 4 is a similar view of the wheel.

A are parallel bars constituting the main frame of the machine separated at their forward ends by the head block B which is raised at its rear end as shown at C, and secured to this raised portion is the backwardly extending spring arm D for the purpose presently to be stated.

At the rear end of the planter is the hopper E having the vertically recessed bottom F which is slotted transversely at G. The seed discharge consists of two plates H and I, the former being immediately over the hopper bottom while the latter extends through slot G. Both plates are secured to the outer end of arm D and are perforated as shown, the perforations however not being in line for the purpose to be explained. Suitably journaled in the frame is the spiked wheel J having on the side adjacent the arm G the annular series of wedges K, while secured to the inner side of arm D is the wedge L extended in an opposite direction from those on the wheel which engage it. As the wheel rotates the wedges thereon engage the wedge on the spring arm, forcing the latter outward and drawing the seed slides beneath the hopper. When the slides are so moved the perforation in slide H registers with the perforation in bottom F allowing the seed to drop on plate I, the perforation of the latter being beneath the bottom. The wedges then disengage with a snap permitting the spring arm to retract thus forcing the plate H from registration with the perforated bottom while plate I is brought to register therewith thus dropping the seed which rested thereon.

The amount of seed dropped at one time may be governed by the size of the opening in bottom F; the upper portion of the latter being readily removable by loosening screws M, Fig. 2, so that bottoms having openings of different sizes may be easily substituted. The spring arm is of stout spring metal so that its action is very quick and positive. For planting cotton any suitable form of agitator may be provided which is operated by the wheel.

Having thus fully described my invention, what I claim as new, and desire to secure by Letters Patent, is—

1. In an improved planter, a frame, a spring metal arm secured at one end thereto, a dropping device on the opposite end of the arm, and a means for vibrating said arm, substantially as shown and described.

2. An improved planter comprising a frame, a hopper, a seed discharger therefor, a wheel, a series of wedges secured thereto, a longitudinal spring arm to the free end of which the discharger is secured, and a wedge on said arm adapted to be engaged by said first named wedges, for the purpose, substantially as shown and described.

3. An improved planter comprising the parallel bars A, a head block between their forward ends which is projected vertically, a spring arm secured to said projected portion and extended rearward parallel with but over said bars, a walking wheel, a series of wedges secured to the side thereof, a wedge for engaging the same carried by the spring arm, a hopper, and a seed slide therefor carried by the free end of the said arm, substantially as shown and described.

In testimony whereof I affix my signature in presence of two witnesses.

JAMES R. NORCOTT.

Witnesses:
A. H. MURPHY,
C. F. ESLINGER.